(12) United States Patent
Zhang et al.

(10) Patent No.: US 12,397,186 B1
(45) Date of Patent: Aug. 26, 2025

(54) SOLID GEL FOAM FIRE EXTINGUISHING AGENT, AND PREPARATION METHOD AND USE THEREOF

(71) Applicant: TIANJIN FIRE SCIENCE AND TECHNOLOGY RESEARCH INSTITUTE OF MEM, Tianjin (CN)

(72) Inventors: Shaoyu Zhang, Tianjin (CN); Dong Lyu, Tianjin (CN); Jingyu Zhu, Tianjin (CN)

(73) Assignee: TIANJIN FIRE SCIENCE AND TECHNOLOGY RESEARCH INSTITUTE OF MEM, Tianjin (CN)

( * ) Notice: Subject to any disclaimer, the term of this patent is extended or adjusted under 35 U.S.C. 154(b) by 0 days.

(21) Appl. No.: 19/206,801

(22) Filed: May 13, 2025

(30) Foreign Application Priority Data

May 15, 2024 (CN) .......................... 202410599992.8

(51) Int. Cl.
| | |
|---|---|
| A62D 1/00 | (2006.01) |
| A61C 3/16 | (2006.01) |
| A62C 3/00 | (2006.01) |
| A62D 1/02 | (2006.01) |

(52) U.S. Cl.
CPC .............. *A62D 1/0064* (2013.01); *A61C 3/16* (2013.01); *A62C 3/002* (2013.01); *A62D 1/0007* (2013.01); *A62D 1/0071* (2013.01)

(58) Field of Classification Search
None
See application file for complete search history.

(56) References Cited

U.S. PATENT DOCUMENTS

| 7,939,601 B1 * | 5/2011 | Bergeron ............. C11D 3/3769 |
| | | 524/808 |
| 10,940,352 B2 * | 3/2021 | Worsman ............. A62D 1/0064 |
| 11,395,934 B2 | 7/2022 | Hulbert et al. |
| 12,110,440 B1 * | 10/2024 | Wang ........................ A62C 3/02 |
| 2018/0325141 A1 * | 11/2018 | Nakajima ............... A21D 13/50 |
| 2020/0139180 A1 | 5/2020 | Lovas et al. |
| 2021/0187337 A1 * | 6/2021 | Worsman ............. A62D 1/0014 |
| 2022/0054876 A1 | 2/2022 | Conboy |

FOREIGN PATENT DOCUMENTS

| CN | 102319499 A | | 1/2012 | |
| CN | 104225857 A | | 12/2014 | |
| CN | 113926129 A | * | 1/2022 | ............... E21F 5/06 |

* cited by examiner

*Primary Examiner* — Joseph D Anthony

(57) ABSTRACT

A solid gel foam fire extinguishing agent includes a material A and a material B; the material A includes the following components in mass percentage: 18% to 25% of an inorganic silicate, 0.25% of sodium carboxymethyl cellulose, 0.25% of sodium alginate, 0.1% to 0.5% of xanthan gum, 0.5% to 1% of polyvinyl alcohol, 0.5% to 1.5% of sodium lauryl sulfate, 0.01% to 0.05% of dodecanol, 0.005% to 0.01% of disodium ethylenediaminetetraacetate, and water as a balance; and the material B includes the following components in mass percentage: 25% of sodium dihydrogen phosphate, 25% of acetic acid, 1% to 1.5% of fatty alcohol polyoxyethylene ether, 0.1% to 0.5% of 3% aqueous film-forming foam, 0.01% to 0.05% of the dodecanol, and water as a balance. The fire extinguishing agent exhibits advantages including low density, low oil wettability, high resistance, high adhesiveness, and foam collapse-resistant properties in fire resistance.

13 Claims, 14 Drawing Sheets

SOLID GEL FOAM FIRE EXTINGUISHING AGENT, AND PREPARATION METHOD AND USE THEREOF

CROSS-REFERENCE TO RELATED APPLICATIONS

This application claims priority to Chinese Patent Application No. 202410599992.8 with a filing date of May 15, 2024. The content of the aforementioned application, including any intervening amendments thereto, is incorporated herein by reference.

TECHNICAL FIELD

The present disclosure belongs to the technical field of firefighting, and specifically relates to a solid gel foam fire extinguishing agent, and a preparation method and use thereof in extinguishing oil fires and electrical fires. In the present disclosure, the foam fire extinguishing agent exhibits advantages such as low density, low oil wettability, high resistance, high adhesiveness, as well as foam collapse-resistant properties in fire resistance.

BACKGROUND

In the process of extinguishing oil fires, traditional foam fire extinguishing agents exhibit significant advantages. The foam can cover the surface of flammable liquids, forming a protective layer to suppress combustion. However, the traditional foam fire extinguishing agents face the following challenges:

Conventional foam primarily consists of water and surfactants. When exposed to prolonged flame radiation, the foam structure collapses. For large-scale oil pool fires (e.g., full-surface fires in massive storage tanks), the foam spreading rate decreases as the coverage area expands. This creates an equilibrium where foam degradation at flame boundaries balances foam expansion. Under limited foam supply, the flame-occupied area cannot be reduced. If foam supply becomes insufficient, flames may degrade previously applied foam layers, leading to rapid fire resurgence and extinguishment failure.

For typical live electrical fires such as photovoltaic system fires, dry powder and gaseous fire extinguishing agents are predominantly used. However, both of the above fire extinguishing agents face critical limitations of full coverage requirement. Dry powder fire extinguishing agents suppress combustion by scavenging free radicals. Partial coverage fails to sufficiently cool combustibles, allowing residual radicals to reignite flames due to inadequate cooling effects. Gaseous fire extinguishing agents extinguish fires through oxygen dilution, radical inhibition, and endothermic expansion, and demonstrate certain cooling effects. While offering better cooling than dry powder, such fire extinguishing agents require enclosed spaces to maintain effective concentrations. In open environments, air rapidly dilutes the gaseous fire extinguishing agents. For large-scale fires, incomplete coverage inevitably results in reignition.

SUMMARY OF PRESENT INVENTION

An objective of the present disclosure is to solve one of the technical problems in the related art at least to some extent. To this end, the embodiments of the present disclosure provide a solid gel foam fire extinguishing agent, and a preparation method and use thereof.

According to a first aspect, the present disclosure provides a solid gel foam fire extinguishing agent, including a material A and a material B; where the material A includes the following components in mass percentage: 18% to 25% of an inorganic silicate, 0.25% of sodium carboxymethyl cellulose (CMC-Na), 0.25% of sodium alginate, 0.1% to 0.5% of xanthan gum, 0.5% to 1% of polyvinyl alcohol (PVA), 0.5% to 1.5% of sodium lauryl sulfate ($C_{12}H_{25}SO_4Na$,SLS), 0.01% to 0.05% of dodecanol, 0.005% to 0.01% of disodium ethylenediaminetetraacetate (EDTA-2Na), and water as a balance; and the material B includes the following components in mass percentage: 25% of sodium dihydrogen phosphate, 25% of acetic acid, 1% to 1.5% of fatty alcohol polyoxyethylene ether, 0.1% to 0.5% of 3% aqueous film-forming foam (AFFF), 0.01% to 0.05% of the dodecanol, and water as a balance.

In some examples, the inorganic silicate is at least one selected from the group consisting of sodium silicate and potassium silicate. Preferably, the inorganic silicate is the sodium silicate.

In some examples, a preparation process of the material A includes the following steps:

dissolving the inorganic silicate in the water under stirring, adding the CMC-Na slowly, conducting rapid stirring to achieve dispersion and dissolution, adding the sodium alginate, the xanthan gum, the PVA, the EDTA-2Na, and the dodecanol, and then adding the SLS to allow stirring for 60 min to 120 min until all of the components are fully dissolved to form the material A.

In some examples, a preparation process of the material B includes the following steps: pouring the sodium dihydrogen phosphate and the dodecanol into the water and stirring, adding the fatty alcohol polyoxyethylene ether, the acetic acid, and the 3% AFFF, and then continuously stirring for 30 min to 60 min until all of the components are dissolved to form the material B.

According to a second aspect, the present disclosure further provides a preparation method of the solid gel foam fire extinguishing agent, including the following steps:

feeding the material A into a first branch pipe of a 3-to-1 pipe connector, feeding the material B into a second branch pipe of the 3-to-1 pipe connector, allowing the material A and the material B to converge from the first branch pipe and the second branch pipe into a header pipe of the 3-to-1 pipe connector at a volume fraction meeting 1.05≤A:B≤1.25 to form an AB mixed solution; and introducing air through a third branch pipe of the 3-to-1 pipe connector, mixing the air with the AB mixed solution at a volume ratio of (5-10):1, and then discharging a resulting liquid mixture to form a foamed gel.

In some examples, a velocity of the AB mixed solution flowing in the header pipe, a header pipe diameter, and a distance from a converging point of the material A and the material B to an introducing point of the air satisfy Formula (1):

$$V \geq \sqrt{\frac{\mu L}{\rho D t}}, \tag{1}$$

where, V represents the velocity of the AB mixed solution flowing in the header pipe, in m/s;

μ represents a liquid viscosity of the AB mixed solution, in Pa·s;

L represents the distance from the converging point of the material A and the material B to the introducing point of the air, in m;

ρ represents a density of the AB mixed solution, in kg/m³;

D represents the header pipe diameter, in m; and t represents a gelation time of the AB mixed solution, in s.

According to a third aspect, the present disclosure further provides use of a solid gel foam fire extinguishing agent in extinguishing an oil fire, where the solid gel foam fire extinguishing agent is the solid gel foam fire extinguishing agent described above.

In some examples, the oil fire is a full surface fire in a large-scale oil storage tank.

According to a fourth aspect:

The present disclosure further provides use of a solid gel foam fire extinguishing agent in extinguishing an electrical fire, where the solid gel foam fire extinguishing agent is the solid gel foam fire extinguishing agent described above.

In some examples, the electrical fire is a photovoltaic system fire.

The present disclosure has the following advantages and beneficial effects:

(1) In the present disclosure, the foam fire extinguishing agent is a reactive gel-type agent composed of a material A and a material B. Such an agent forms a semi-gel state within pipelines and during ejection, rapidly adheres to fire targets to create a solid gel. This agent exhibits advantages including low density, low oil wettability, high resistance, high adhesiveness, as well as foam collapse-resistant properties in fire resistance.

(2) The foam fire extinguishing agent features minimal density (approximately 0.25 g/cm³), enabling it to float atop typical oil products without being wetted or dissolving/sinking into the oil. This agent demonstrates exceptional foam stability under flame exposure, allowing prolonged coverage on oil pool surfaces engulfed by flames. Consequently, areas covered by this agent become inaccessible to flames. Even with extremely low foam supply intensity, flame encroachment into foam-covered zones is prevented, enabling continuous reduction of pool fire areas until complete fire suppression.

(3) The foam fire extinguishing agent exhibits high electrical resistance and poor conductivity. Instead of generating water or electrolyte-containing solutions, this agent directly forms a gel with extremely low conductivity. Tests show a resistance exceeding 100 kΩ over 3 cm (human body resistance is approximately 1 kΩ under 500 V). For 500 V photovoltaic panels, leakage current exposure at 3 cm distance can be below 5 mA. When foamed during application, the expanded gel foam demonstrates even higher resistance (greater than 2 MΩ at 1,500 V DC) compared to firefighting water streams (approximately 8,400Ω over 11 m). Additionally, the gel's non-flow characteristics prevent electrical current transmission through fluid paths, ensuring rescuer safety.

(4) The foam fire extinguishing agent demonstrates superior adhesion capabilities. Such an agent resists runoff on vertical or inclined surfaces (e.g., photovoltaic panels), forming a thermal barrier containing both air pores (insulation) and water of crystallization (heat absorption). This dense barrier simultaneously achieves oxygen deprivation cooling and prevents reignition in covered areas.

(5) After long-term dehydration, the foam fire extinguishing agent's primary component, silica powder, matches soil composition. Other components are non-toxic and environmentally benign. The disintegrated residue gradually self-disintegrates over time and readily detaches with minimal mechanical force.

BRIEF DESCRIPTION OF THE DRAWINGS

The above and/or additional aspects and advantages of the present disclosure will become apparent and easily understandable from the following descriptions of the embodiments with reference to the accompanying drawings.

DETAILED DESCRIPTION OF THE EMBODIMENTS

Figure 1:
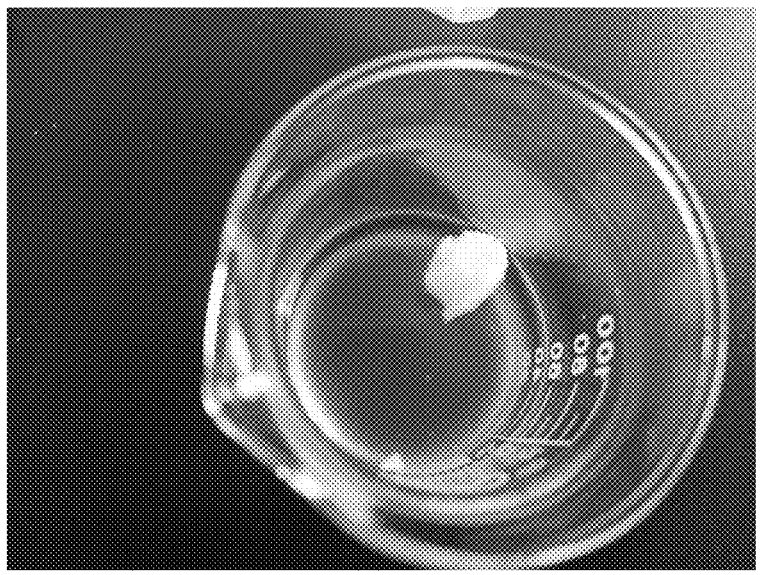
FIG. 1 shows a photo of the foam fire extinguishing agent from Example 1 placed in gasoline.

In order to make the objective, technical solution and advantages of the examples of the present disclosure clearer, the technical solutions in the examples of the present disclosure will be described clearly and completely below. Apparently, the described examples are a part of, but not all of, the examples of the present disclosure. Based on the described examples of the present disclosure, all other examples obtained by those of ordinary skill in the art without creative work shall fall within the protection scope of the present disclosure.

In this specification, the term "and/or" merely describes an association relationship between associated objects, indicating that there may be three kinds of relationships. For example, A and/or B may represent the following three cases: there is A alone; there is B alone; and there are both A and B.

As used herein, the term "approximately" means +/−10%, more preferably +/−5%, and even more preferably +/−1% of the specified value.

In the present disclosure, when a value is expressed as a range, it should be understood that all possible sub-ranges within this range and specific values falling within this range are included, regardless of whether specific values or specific sub-ranges are explicitly indicated.

The present disclosure provides a solid gel foam fire extinguishing agent, including a material A and a material B.

The material A includes the following components in mass percentage: 18% to 25% of an inorganic silicate, 0.25% of sodium carboxymethyl cellulose (CMC-Na), 0.25% of sodium alginate, 0.1% to 0.5% of xanthan gum, 0.5% to 1% of polyvinyl alcohol (PVA), 0.5% to 1.5% of sodium lauryl sulfate (SLS), 0.01% to 0.05% of dodecanol, 0.005% to 0.01% of disodium ethylenediaminetetraacetate (EDTA-2Na), and water as a balance.

The material B includes the following components in mass percentage: 25% of sodium dihydrogen phosphate, 25% of acetic acid, 1% to 1.5% of fatty alcohol polyoxyethylene ether, 0.1% to 0.5% of 3% aqueous film-forming foam (AFFF), 0.01% to 0.05% of the dodecanol, and water as a balance.

Non-limiting examples include: in the composition of material A, the mass percentage of inorganic silicate may be 18%, 19%, 20%, 22%, 23%, 25%; the mass percentage of CMC-Na may be 0.25%; the mass percentage of sodium alginate may be 0.25%; the mass percentage of xanthan gum may be 0.1%, 0.2%, 0.3%, 0.4%, 0.5%; the mass percentage of PVA may be 0.5%, 0.6%, 0.7%, 0.8%, 0.9%, 1%; the mass percentage of SLS may be 0.5%, 0.6%, 0.8%, 1.0%, 1.2%, 1.5%; the mass percentage of dodecanol may be 0.01%, 0.02%, 0.03%, 0.04%, 0.05%; the mass percentage of EDTA-2Na may be 0.005%, 0.006%, 0.007%, 0.008%, 0.009%, 0.01%; the water serves as a balance.

Non-limiting examples include: in the composition of material B, the mass percentage of sodium dihydrogen phosphate may be 25%; the mass percentage of acetic acid may be 25%; the mass percentage of fatty alcohol polyoxyethylene ether may be 1%, 1.1%, 1.2%, 1.3%, 1.4%, 1.5%; the mass percentage of 3% AFFF may be 0.1%, 0.2%, 0.3%, 0.4%, 0.5%; the mass percentage of dodecanol may be 0.01%, 0.02%, 0.03%, 0.04%, 0.05%; the water serves as a balance.

In some examples, the inorganic silicate is at least one selected from the group consisting of sodium silicate and potassium silicate. Preferably, the inorganic silicate is the sodium silicate.

In some examples, a preparation process of the material A includes the following steps:
dissolving the inorganic silicate in the water under stirring, adding the CMC-Na slowly, conducting rapid stirring to achieve dispersion and dissolution, adding the sodium alginate, the xanthan gum, the PVA, the EDTA-2Na, and the dodecanol, and then adding the SLS to allow stirring for 60 min to 120 min until all of the components are fully dissolved to form the material A. Non-limiting examples include: the stirring may be conducted for 60 min, 70 min, 80 min, 90 min, 100 min, 110 min, or 120 min.

In some examples, a preparation process of the material B includes the following steps: pouring the sodium dihydrogen phosphate and the dodecanol into the water and stirring, adding the fatty alcohol polyoxyethylene ether, the acetic acid, and the 3% AFFF, and then continuously stirring for 30 min to 60 min until all of the components are dissolved to form the material B. Non-limiting examples include: the stirring may be conducted for 30 min, 35 min, 40 min, 45 min, 50 min, 55 min, or 60 min.

The present disclosure further provides a preparation method of the solid gel foam fire extinguishing agent, including the following steps:
feeding the material A into a first branch pipe of a 3-to-1 pipe connector, feeding the material B into a second branch pipe of the 3-to-1 pipe connector, allowing the material A and the material B to converge from the first branch pipe and the second branch pipe into a header pipe of the 3-to-1 pipe connector at a volume fraction meeting 1.05≤A:B≤1.25 to form an AB mixed solution; and introducing air through a third branch pipe of the 3-to-1 pipe connector, mixing the air with the AB mixed solution at a volume ratio of (5-10):1, and then discharging a resulting liquid mixture to form a foamed gel.

Non-limiting examples include: the volume ratio of the material A to the material B may be 1.05:1, 1.1:1, 1.15:1, 1.2:1, or 1.25:1. The volume ratio of the air to the AB mixed solution can be 5:1, 6:1, 7:1, 8:1, 9:1, or 10:1.

In some examples, a velocity of the AB mixed solution flowing in the header pipe, a header pipe diameter, and a distance from a converging point of the material A and the material B to an introducing point of the air satisfy Formula (1):

$$V \geq \sqrt{\frac{\mu L}{\rho D t}}, \quad (1)$$

where, V represents the velocity of the AB mixed solution flowing in the header pipe, in m/s;
μ represents a liquid viscosity of the AB mixed solution, in Pa·s;
L represents the distance from the converging point of the material A and the material
B to the introducing point of the air, in m; ρ represents a density of the AB mixed solution, in kg/m³;
D represents the header pipe diameter, in m; and
t represents a gelation time of the AB mixed solution, in s.

It should be noted that the gelation time refers to a duration taken for a liquid state to become a viscous state. In the formulation system of the present disclosure, t is 0.6 s to 0.7 s.

According to a third aspect:
The present disclosure further provides use of a solid gel foam fire extinguishing agent in extinguishing an oil fire, where the solid gel foam fire extinguishing agent is the solid gel foam fire extinguishing agent described above.

In some examples, the oil fire is a full surface fire in a large-scale oil storage tank.

According to a fourth aspect:
The present disclosure further provides use of a solid gel foam fire extinguishing agent in extinguishing an electrical fire, where the solid gel foam fire extinguishing agent is the solid gel foam fire extinguishing agent described above.

In some examples, the electrical fire is a photovoltaic system fire.

Specific examples and comparative examples of the present disclosure are provided below. It should be noted that technical solutions in the following comparative examples are not the prior arts, and are provided merely for comparison with the solutions in the examples, but are not intended to limit the present disclosure.

Example 1

A solid gel foam fire extinguishing agent includes a material A and a material B.

The material A includes the following components in mass percentage: 20% of sodium silicate, 0.25% of CMC-Na, 0.25% of sodium alginate, 0.3% of xanthan gum, 0.7% of PVA, 1% of SLS, 0.025% of dodecanol, 0.007% of EDTA-2Na, and water as a balance.

The material B includes the following components in mass percentage: 25% of sodium dihydrogen phosphate, 25% of acetic acid, 1.2% of fatty alcohol polyoxyethylene ether, 0.25% of 3% AFFF, 0.025% of the dodecanol, and water as a balance.

A preparation method of the solid gel foam fire extinguishing agent includes the following steps:

The inorganic silicate is dissolved in the water under stirring, the CMC-Na is added slowly, rapid stirring is conducted to achieve dispersion and dissolution, the sodium alginate, the xanthan gum, the PVA, the EDTA-2Na, and the dodecanol are added, and then the SLS is added to allow stirring for 90 min until all of the components are fully dissolved to form the material A;

The sodium dihydrogen phosphate and the dodecanol are poured into the water and stirred, the fatty alcohol polyoxyethylene ether, the acetic acid, and the 3% AFFF are added, and then continuously stirred for 40 min until all of the components are dissolved to form the material B; and The material A is fed into a first branch pipe of a 3-to-1 pipe connector, the material B is fed into a second branch pipe of the 3-to-1 pipe connector, the material A and the material B are allowed to converge from the first branch pipe and the second branch pipe into a header pipe of the 3-to-1 pipe connector at a volume fraction meeting A:B=1.1:1 to form an AB mixed solution; and air is introduced through a third branch pipe of the 3-to-1 pipe connector, the air is mixed with the AB mixed solution at a volume ratio of 7:1, and then a resulting liquid mixture is discharged to form a foamed gel.

A velocity of the AB mixed solution flowing in the header pipe, a header pipe diameter, and a distance from a converging point of the material A and the material B to an introducing point of the air satisfies Formula (1):

$$V \geq \sqrt{\frac{\mu L}{\rho D t}}, \quad (1)$$

where, $\mu$ represents a liquid viscosity of the AB mixed solution, in Pa·s; $\mu$ is 20 Pa·s in this example;
  L represents the distance from the converging point of the material A and the material
  B to the introducing point of the air, in m; L is 0.1 m in this example;
  $\rho$ represents a density of the AB mixed solution, in kg/m³; p is 1,200 kg/m³ in this example;
  D represents the header pipe diameter, in m; D is 0.06 m in this example; and
  t represents a gelation time of the AB mixed solution, in s; t is 0.7 s in this example;
    V represents the velocity of the AB mixed solution flowing in the header pipe, in m/s; and
  Calculation shows that V is greater than or equal to 0.2 m/s, indicating that the flow rate of the A+B liquid pump should be at least greater than or equal to 2 m³/h.

Experimental Data
(1) Density

The product density of Example 1 is approximately 0.25 g/mL. FIG. 1 shows the foam fire extinguishing agent product of Example 1 placed in gasoline. As seen in FIG. 1, the foam fire extinguishing agent of the present disclosure does not dissolve in oil and floats on the oil surface, achieving suffocation-based fire suppression through coverage.

(2) Foam Expansion Ratio

Tested according to GB15308-2006, the foam expansion ratio is approximately 5 fold, with no drainage observed (i.e., no bubble collapses or drainage time occurs).

(3) Oil Pool Fire Test

Figure 2:
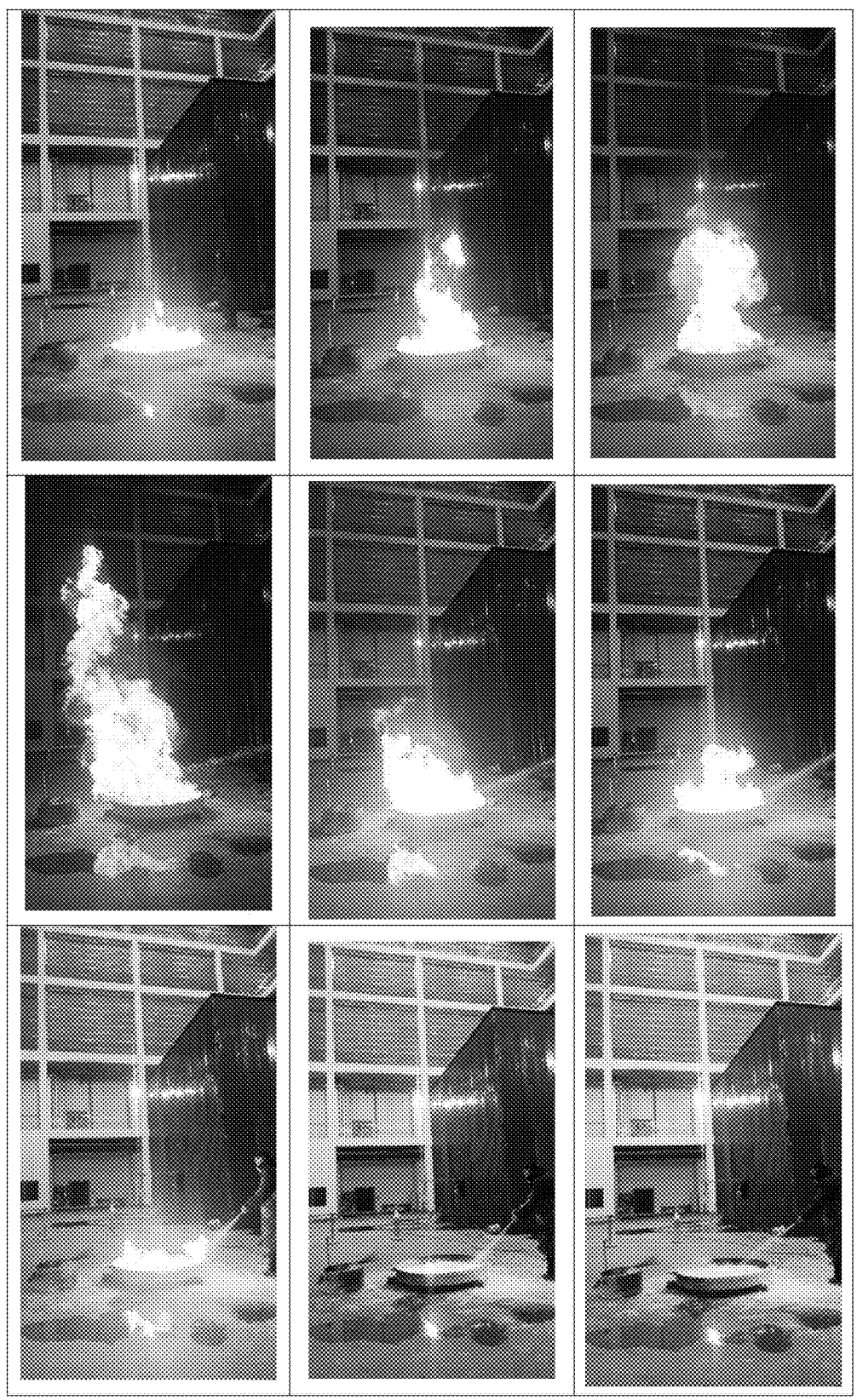
FIG. 2 shows the fire extinguishing scenario of the foam fire extinguishing agent from Example 1 against an oil pool fire.

For a 2 m-diameter gasoline oil pool (FIG. 2), the foam fire extinguishing agent of Example 1 extinguishes the fire within 25 s.

Figure 3:
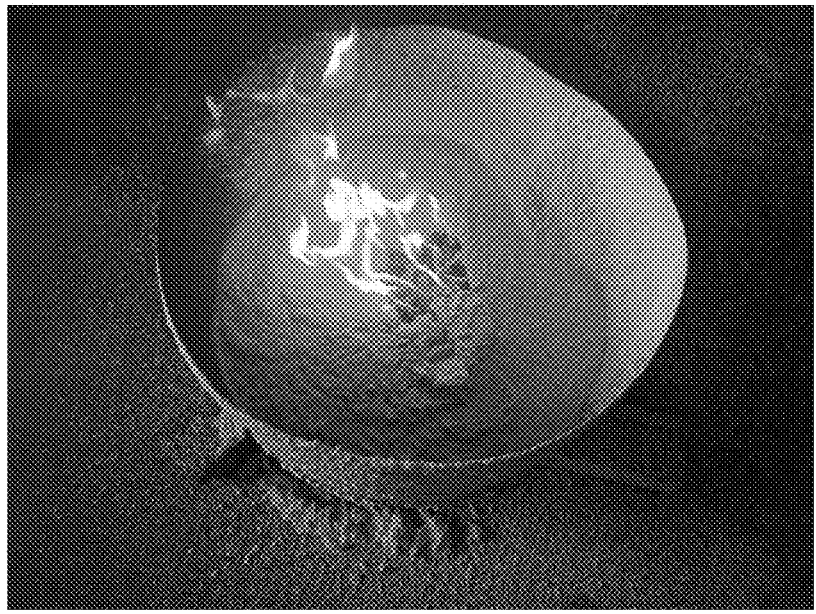
FIG. 3 shows the reignition resistance test of the foam fire extinguishing agent from Example 1 on an oil pool fire.
Figure 3:
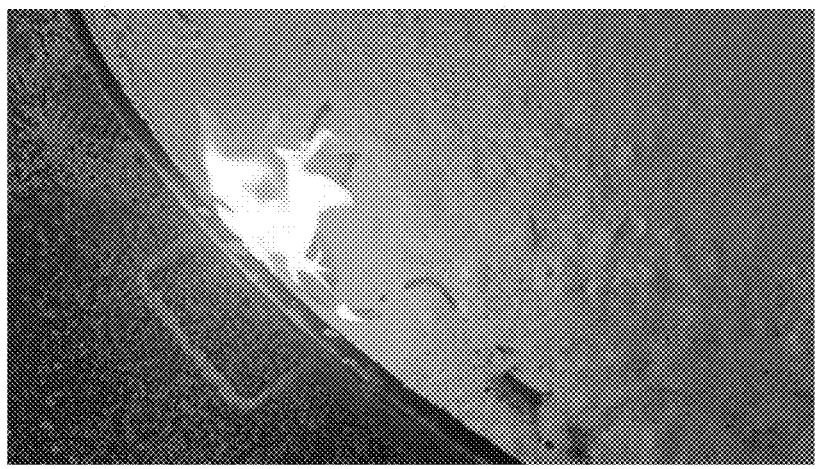

Unlike conventional foams, which may leave flame gaps if unable to spread to all corners and gradually lose foam integrity under flame exposure (leading to expanding fire areas and accelerating foam degradation until full surface reignition), the foam of the present disclosure maintains integrity for extended periods (no collapse observed after 60 min in testing). Consequently, flames cannot penetrate foam-covered areas. As the liquid pool shrink, flame height decreases, enabling progressive fire control until complete extinguishment (FIG. 3).

(4) Electrical Resistance Test

Figure 4:
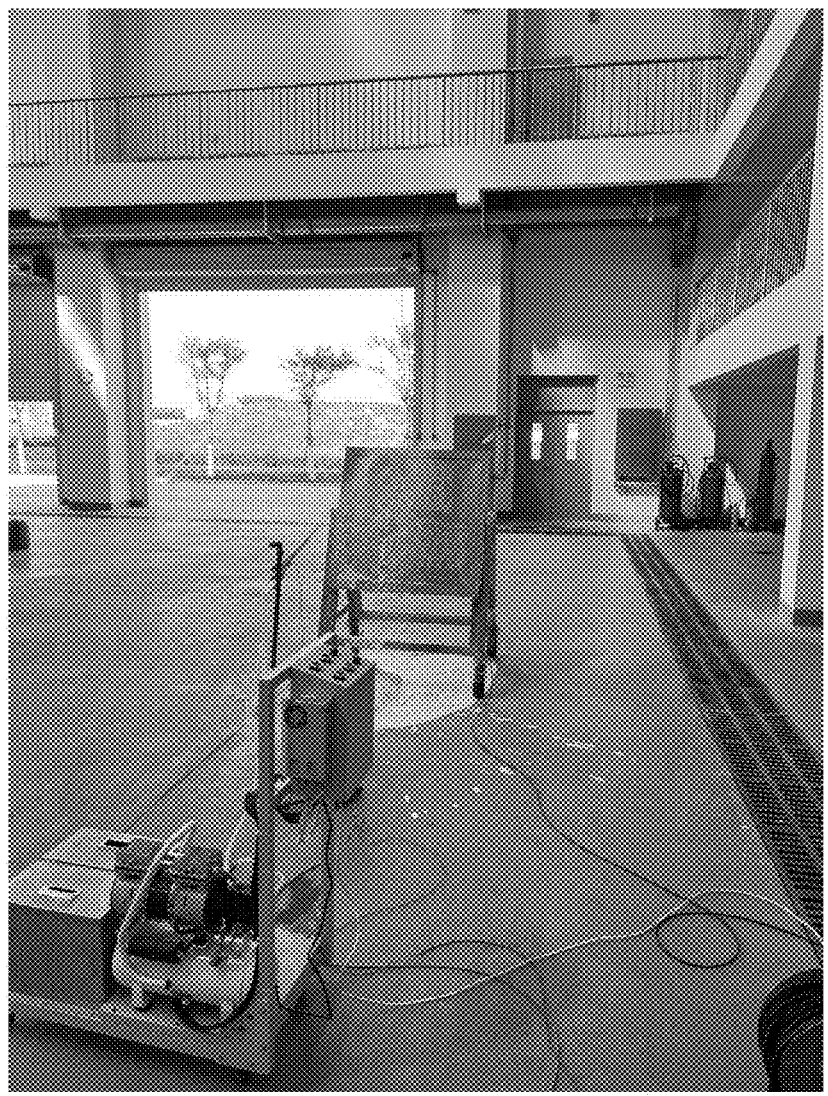
FIG. 4 shows the resistivity experiment of the foam fire extinguishing agent from Example 1.

As shown in FIG. 4, a grid-shaped metal plate is set up with a spraying device equipped with a nozzle (inner diameter: 6 mm) directed at the plate. The plate is insulated from the ground using rubber and loaded with a 1,200 V DC voltage. The spraying device, mounted on an insulated base, incorporates a voltage transmitter to measure the voltage between the nozzle and ground. At a flow rate of 20 L/min and a distance of 1 m from the plate, the measured voltage is 0 V. In contrast, water testing under the same conditions yields a ground voltage of 600 V.

(5) Adhesion Test

Figure 5:
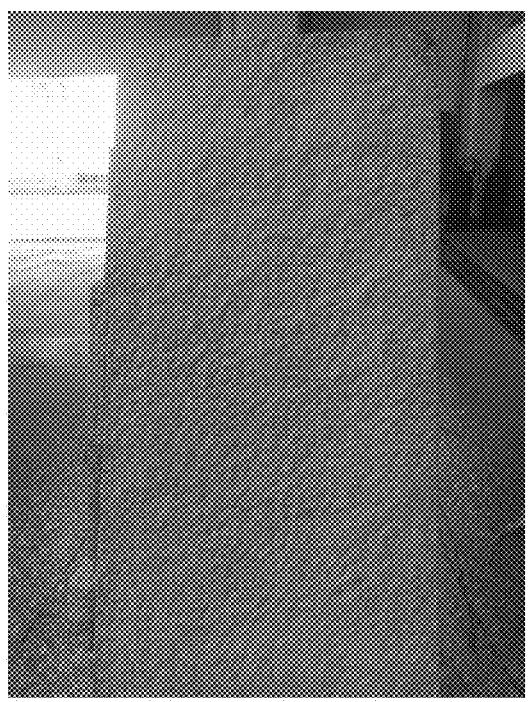
FIG. 5 shows the coverage test of the foam fire extinguishing agent from Example 1 on the glass surface of a photovoltaic panel.

Field tests demonstrate that the gel foam produced by the foam fire extinguishing agent of Example 1 rapidly solidifies and adheres to surfaces such as photovoltaic panel glass (75° tilt angle, FIG. 5) and wooden boards (45° tilt angle), with no slippage observed.

(6) Fire Resistance Test

Figure 6:
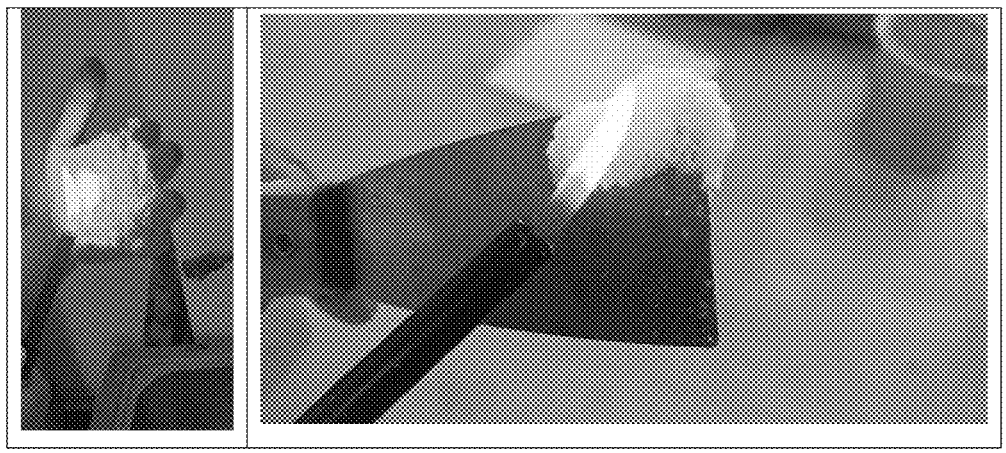
FIG. 6 shows the resistance of a coating prepared with the foam fire extinguishing agent from Example 1 to a lighter flame.

The foam exhibits excellent flame resistance. As shown in FIG. 6 (left), a 2-3 mm coating resists lighter flame exposure for 60 s. Due to water being trapped as water of crystallization within the foam, dehydration under flame exposure is minimal, while high porosity ensures effective heat insulation.

Figure 7:
FIG. 7 shows the fire resistance experiment of the foam fire extinguishing agent from Example 1 sprayed onto an ordinary five-layer plywood.

FIG. 7 illustrates the application of the foam fire extinguishing agent from Example 1 sprayed onto standard five-layer plywood. Untreated five-layer plywood exposed to a standard methane flame burns through in approximately 10 s. However, when the foam fire extinguishing agent from Example 1 is applied to the underside of five-layer plywood (45° tilt angle), burn-through occurs only after 19 min. This is primarily due to foam gel detachment in chunks at about 18 min, leaving the five-layer plywood unprotected. In vertical orientation, fire resistance exceeds 30 min.

Comparative Example 1

The difference from Example 1 is that the sodium silicate in material A of Comparative Example 1 is 10%. All other components and conditions remain identical to Example 1.

Figure 8:
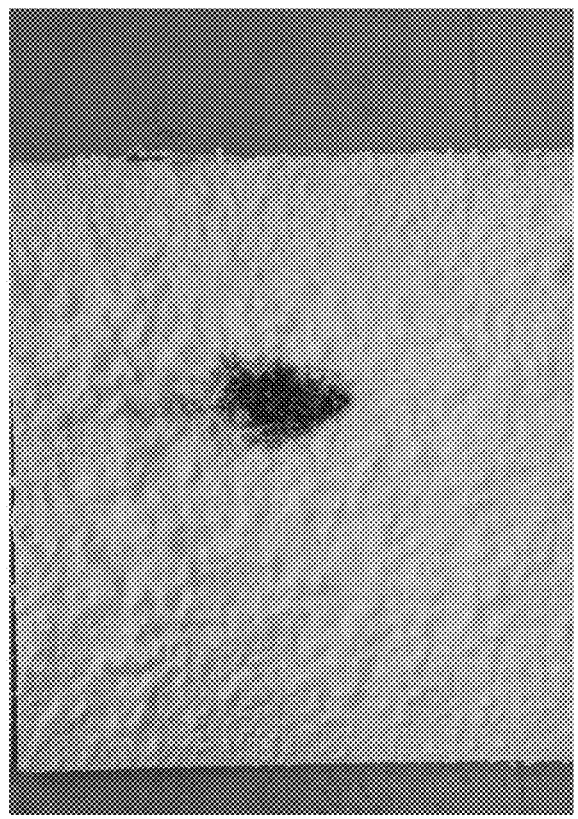
FIG. 8 shows a photo of the product prepared using the method from Comparative Example 1.

Experimental findings reveal that, compared to Example 1, the lower sodium silicate concentration in Comparative Example 1 generates numerous liquid-based fine bubbles. As shown in FIG. 8, the foam appears uniform but remains liquid-like. This foam collapses when exposes to flame proximity or residual fire in oil.

Comparative Example 2

The difference from Example 1 is that material A of Comparative Example 2 includes 0 CMC-Na and 0 sodium alginate. All other components and conditions remain identical to Example 1.

Figure 9:
FIG. 9 shows the disintegration of the product prepared using the method from Comparative Example 2 in gasoline.

Experimental observations indicate that the gel formed in Comparative Example 2 is highly prone to disintegration (FIG. 9). Even when gel foam is formed, it readily disperses in gasoline and settles to the bottom of the oil layer.

Comparative Example 3

The difference from Example 1 is that material A of Comparative Example 3 includes 0.5% CMC-Na and 0 sodium alginate. All other components and conditions remain identical to Example 1.

Testing shows that the gel foam discharged from Comparative Example 3 exhibits increased resistance during ejection, resulting in reduced projection range under identical equipment configurations. For instance, the projection range in Example 1 is approximately 15 m, whereas in Comparative Example 3, it decreases to about 12 m.

Comparative Example 4

The difference from Example 1 is that material A of Comparative Example 4 includes 0 CMC-Na and 0.5% sodium alginate. All other components and conditions remain identical to Example 1.

Figure 10:
FIG. 10 shows a photo of the product prepared using the method from Comparative Example 4.

Experimental results demonstrate that the solution ejected from Comparative Example 4 is overly thin, producing foam with poor structural integrity (FIG. 10). The sparse foam collapses readily under flame exposure.

Comparative Example 5

The difference from Example 1 is that material A of Comparative Example 5 includes 0.5% CMC-Na and 0.5% sodium alginate. All other components and conditions remain identical to Example 1.

Figure 11:
FIG. 11 shows the sedimentation and agglomeration observed in the product prepared using the method from Comparative Example 5.

Testing reveals the formation of deposits and agglomerations in Comparative Example 5 (FIG. 11). These deposits partially block gas injection ports. While only minor clogging occurs, the overall risk of system blockage is increased significantly.

Through comparison of Example 1 with Comparative Examples 2 to 5, it is demonstrated that maintaining CMC-Na and sodium alginate concentrations in material A of the foam fire extinguishing agent formulation at 0.25% each (as specified in the present disclosure) significantly enhances gel structural integrity. This optimal ratio ensures uniform distribution of fine bubbles throughout the gel matrix, eliminating localized deposition or agglomeration. Consequently, the risk of gas injection port blockage caused by deposit accumulation is effectively mitigated.

Comparative Example 6

The difference from Example 1 is that material A of Comparative Example 6 includes 0% xanthan gum and 0% PVA. All other components and conditions remain identical to Example 1.

Figure 12:
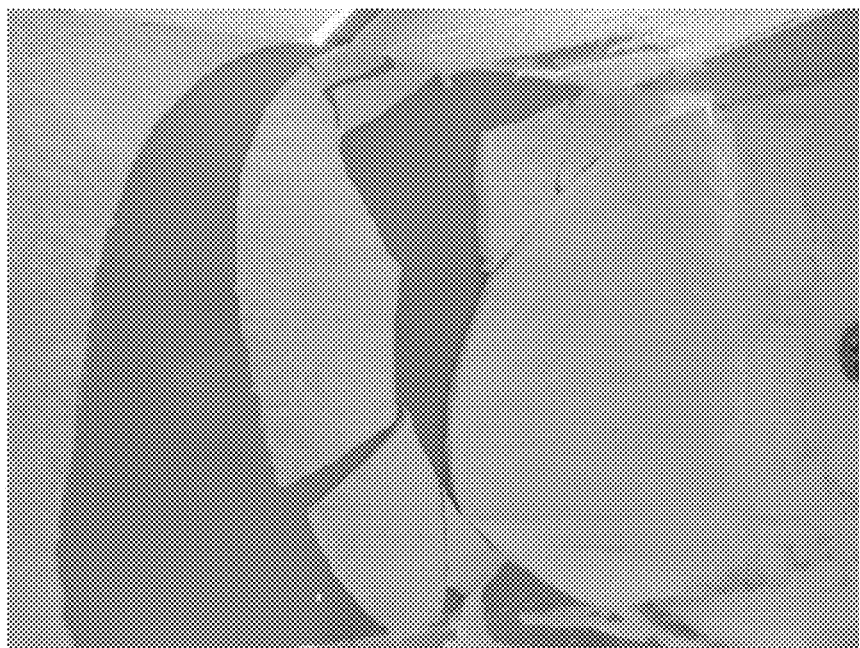
FIG. 12 shows the adhesion performance of the product prepared using the method from Comparative Example 6.

When xanthan gum and PVA are omitted, the projection range remains nearly unchanged at about 15 m. Thus, the addition of these two binding agents does not increase resistance during liquid ejection. However, as shown in FIG. 12, the absence of these components results in poor adhesion and reduces dry shear strength of the foam, leading to slippage from vertical surfaces.

Xanthan gum serves two roles: enhancing bubble stability within the silica gel, similar to sodium alginate and CMC-Na; increasing liquid viscosity in conjunction with PVA. In vertical surface fires, viscosity is critical for maintaining gel foam adhesion, preventing it from flowing away as quickly as water or conventional foam. A key advantage of xanthan gum and PVA in this gel system is their shear-thinning behavior. When the foam fire extinguishing agent is ejected at high velocities (>10 m/s, even >20 m/s), the viscosity decreases, facilitating high-speed projection. High viscosity in the gel nozzle may otherwise hinder ejection, requiring greater motor power and significantly reducing range. Conversely, upon reaching the target (where velocity decreases), increased viscosity is necessary for vertical surface adhesion. The shear-thinning properties of xanthan gum and PVA precisely meet this requirement. Testing demonstrates that incorporating 0.1% to 0.5% of xanthan gum and 0.5% to 1% of PVA ensures sufficient viscosity for rapid vertical surface adhesion (mitigating vertical fire spread) while maintaining projection range equivalent to formulations without these components.

Comparative Example 7

The difference from Example 1 is that material A includes 0% dodecanol and material B includes 0% dodecanol in Comparative Example 7. All other components and conditions remain identical to Example 1.

Experimental findings reveal that the silica gel formed in Comparative Example 7 exhibits a higher density (about 0.6 g/cm$^3$) and highly non-uniform foam. When placed in gasoline, partial density-driven settling occurs under vibration. This occurs because dodecanol significantly enhances foam stability in surfactant aqueous solutions. In the formulation of Example 1, during silica gel formation, a gas-liquid film is initially generated. Dodecanol adsorbs onto the gas-liquid film surface to form a bilayer film, prolonging foam lifespan. This mechanism prevents bubble collapse during the transition from liquid to solid foam. Compared to Comparative Example 7, the inclusion of dodecanol in Example 1 substantially improves solid foam stability, achieving a density of about 0.25 g/cm$^3$. This optimized density not only makes the formulation highly effective for oil fires but also significantly reduces foam solution consumption.

Comparative Example 8

Figure 13:
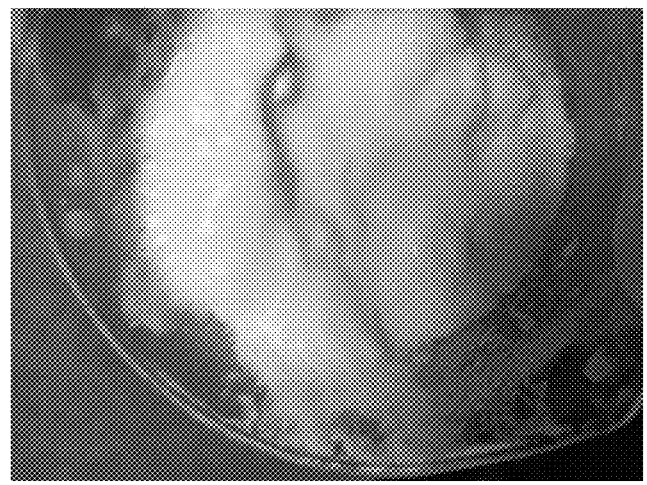
FIG. 13 shows the foaming effect of the material B prepared in Comparative Example 8.
Figure 13:

SLS is added to material B to replace AFFF in material B. The foaming effect of material B is extremely poor, as shown in FIG. 13, with almost no visible foam.

Additionally, slow dissolution and poor solubility are observed, likely due to severe hydrolysis of SLS in the acidic solution, which significantly reduces its foaming capacity.

Foaming in material B is critical because acidic substances generally exhibit high surface tension and poor foaming ability. The foaming performance of material B directly impacts the overall foaming of the silica gel. Balancing cost-effectiveness and performance, experimental optimization identifies that 1% to 1.5% of fatty alcohol polyoxyethylene ether combined with 0.1% to 0.5% of 3% AFFF (3% AFFF being a typical commercial aqueous film-forming foam extinguishing agent) achieves both economic efficiency and high effectiveness.

Comparative Example 9

The difference from Example 1 is that material B of Comparative Example 9 includes 0% sodium dihydrogen phosphate and 50% acetic acid. All other components and conditions remain identical to Example 1.

Experimental findings reveal the following issues due to the absence of sodium dihydrogen phosphate:

(1) Lack of pH buffering: if material B flow deviates (possible in gel fire extinguishing agent systems due to temporary partial pipe blockages), excess material A flow causes the colloidal pH value to exceed 10 (resulting in non-intact colloids). These colloids become highly fluid, exhibiting severe slippage on vertical surfaces and failing to provide coverage.

Figure 14:
FIG. 14 shows the adhesion performance of the product prepared using the method from Comparative Example 9.

(2) Poor foaming and excessive adhesion: the foam fire extinguishing agent from Comparative Example 9 not only struggles to foam but also forms strong adhesion after drying on solid surfaces (FIG. 14). Post-fire cleanup requires scraping with an iron shovel, significantly complicating post-extinguishment remediation.

Comparative Example 10

The difference from Example 1 is that material B of Comparative Example 10 includes 0% acetic acid. All other components and conditions remain identical to Example 1.

Testing shows that the product fails to achieve gelation (at about pH=10) and slide down vertical surfaces. During fire scenarios, large sections of the material detach, eliminating its protective isolation effect on combustibles.

Through comparison of Example 1 with Comparative Examples 9 and 10, the formulation in Example 1 (sodium dihydrogen phosphate: 25%; acetic acid: 25%) is demonstrated to ensure silica gel foam adhesion during fires while minimizing post-fire remediation challenges.

In the present disclosure, the terms such as "first" and "second" are used only for descriptive purposes, and should not be construed as indicating or implying relative importance or implying the number of indicated technical features. Thus, features limited by "first" and "second" may expressly or implicitly include at least one of that feature. In the descriptions about the present disclosure, "a plurality of" means at least two, for example, two or three, unless otherwise specifically limited.

In the present disclosure, the terms such as "one embodiment", "some embodiments", "an example", "a specific example", and "some examples" indicate that specific features, structures, materials, or characteristics described in combination with the embodiment(s) or example(s) are included in at least one embodiment or example of the present disclosure. In this specification, the schematic expression of the above terms is not necessarily directed to the same embodiment or example. Furthermore, the specific features, structures, materials, or characteristics described may be combined in a suitable manner in any one or more of embodiments or examples. In addition, those skilled in the art may combine different embodiments or examples described in this specification and characteristics of the different embodiments or examples without mutual contradiction.

Although the examples of the present disclosure have been illustrated and described above, it will be appreciated that the above examples are illustrative and should not be construed as limiting the scope of the present disclosure. Changes, modifications, substitutions and variations can be made to the above examples by a person of ordinary skill in the art within the scope of the present disclosure.

What is claimed is:

1. A solid gel foam fire extinguishing agent, comprising a material A and a material B; wherein
    the material A comprises the following components in mass percentage: 18% to 25% of an inorganic silicate, 0.25% of sodium carboxymethyl cellulose (CMC-Na), 0.25% of sodium alginate, 0.1% to 0.5% of xanthan gum, 0.5% to 1% of polyvinyl alcohol (PVA), 0.5% to 1.5% of sodium lauryl sulfate (SLS), 0.01% to 0.05% of dodecanol, 0.005% to 0.01% of disodium ethylenediaminetetraacetate (EDTA-2Na), and water as a balance; and
    the material B comprises the following components in mass percentage: 25% of sodium dihydrogen phosphate, 25% of acetic acid, 1% to 1.5% of fatty alcohol polyoxyethylene ether, 0.1% to 0.5% of 3% aqueous film-forming foam (AFFF), 0.01% to 0.05% of the dodecanol, and water as a balance; and
    wherein the volume fraction of material A to material B is 1.05≤A:B≤1.25 to form a AB mixed solution.

2. The solid gel foam fire extinguishing agent according to claim 1, wherein the inorganic silicate is at least one selected from the group consisting of sodium silicate and potassium silicate.

3. The solid gel foam fire extinguishing agent according to claim 2, wherein the inorganic silicate is the sodium silicate.

4. The solid gel foam fire extinguishing agent according to claim 1, wherein a preparation process of the material A comprises the following steps: dissolving the inorganic silicate in the water under stirring, adding the CMC-Na, conducting stirring to achieve dispersion and dissolution, adding the sodium alginate, the xanthan gum, the PVA, EDTA-2Na, and the dodecanol, and then adding the SLS to allow stirring for 60 min to 120 min until all the components of the material A are fully dissolved to form the material A.

5. The solid gel foam fire extinguishing agent according to claim 1, wherein a preparation process of the material B comprises the following steps: pouring the sodium dihydrogen phosphate and the dodecanol into the water and stirring, adding the fatty alcohol polyoxyethylene ether, the acetic acid, and the 3% AFFF, and then continuously stirring for 30 min to 60 min until all the components of the material B are dissolved to form the material B.

6. A preparation method of the solid gel foam fire extinguishing agent according to claim 1, comprising the following steps:
    feeding the material A into a first branch pipe of a 3-to-1 pipe connector;
    feeding the material B into a second branch pipe of the 3-to-1 pipe connector;
    allowing the material A and the material B to converge from the first branch pipe and the second branch pipe into a header pipe of the 3-to-1 pipe connector at a volume fraction meeting 1.05≤A:B≤1.25 to form an AB mixed solution;
    introducing air through a third branch pipe of the 3-to-1 pipe connector;
    mixing the air with the AB mixed solution at a volume ratio of (5-10):1; and then discharging a resulting liquid mixture to form a foamed gel.

7. The preparation method according to claim 6, wherein a velocity of the AB mixed solution flowing in the header pipe, a header pipe diameter, and a distance from a converging point of the material A and the material B to an introducing point of the air satisfy Formula (1):

$$V \geq \sqrt{\frac{\mu L}{\rho D t}}, \quad (1)$$

wherein, V represents the velocity of the AB mixed solution flowing in the header pipe, in m/s;
μ represents a liquid viscosity of the AB mixed solution, in Pa·s;
L represents the distance from the converging point of the material A and the material B to the introducing point of the air, in m;
μ represents a density of the AB mixed solution, in kg/m³;
D represents the header pipe diameter, in m; and
t represents a gelation time of the AB mixed solution, in s.

8. A method of using a solid gel foam fire extinguishing agent in extinguishing an oil fire, wherein the solid gel foam fire extinguishing agent is the solid gel foam fire extinguishing agent according to claim 1 which is applied to the fire.

9. The method according to claim 8, wherein the oil fire is a full surface fire in a large-scale oil storage tank.

10. A method of using a solid gel foam fire extinguishing agent in extinguishing an electrical fire, wherein the solid gel foam fire extinguishing agent is the solid gel foam fire extinguishing agent according to claim 1 which is applied to the fire.

11. The method according to claim 10, wherein the electrical fire is a photovoltaic system fire.

12. A method of using a solid gel foam fire extinguishing agent in extinguishing an oil fire, wherein the solid gel foam fire extinguishing agent is a solid gel foam fire extinguishing agent prepared by the preparation method according to claim 6 which is applied to the fire.

13. A method of using a solid gel foam fire extinguishing agent in extinguishing an electrical fire, wherein the solid gel foam fire extinguishing agent is a solid gel foam fire extinguishing agent prepared by the preparation method according to claim 6 which is applied to the fire.

\* \* \* \* \*